W. O'KEEFE.
Hydraulic-Elevator.

No. 206,353. Patented July 23, 1878.

ATTEST.
Chas Hall
Le Blond Burditt

INVENTOR,
William O'Keefe
By Knight & Bro.
Attys.

UNITED STATES PATENT OFFICE.

WILLIAM O'KEEFE, OF ST. LOUIS, MISSOURI.

IMPROVEMENT IN HYDRAULIC ELEVATORS.

Specification forming part of Letters Patent No. 206,353, dated July 23, 1878; application filed July 2, 1877.

*To all whom it may concern:*

Be it known that I, WILLIAM O'KEEFE, of the city of St. Louis and State of Missouri, have invented certain new and useful Improvements in Hydraulic Elevators, of which the following is a full, clear, and exact description, reference being had to the accompanying drawings, forming part of this specification.

My improvement has a cylinder close at one end and open at the other. In communication with the close end are inflow and outflow water-pipes, the one in communication with some water-supply under pressure, such as the city water-pipes or an elevated tank, and the other (the outflow-pipe) having connection with the sewer or other wasteway, or to some place where the water may be made available for another purpose. A drum-shaft passes diametrically through the cylinder near the closed end, said shaft turning in water-packing boxes to prevent the escape of water from the cylinder. Upon this shaft are two drums, one outside the cylinder, around which is coiled the cable, extending to the hoister-car, and the other upon the inside, upon which is coiled the chain or chains, or cable or cables, which extend around pulleys, turning within a piston working in the cylinder, said chains extending from the moving pulleys or drum to an equalizer or compensating-lever or pivoted cross-bar outside the closed head, so as to hold the two chains at the same tension, and the chains end in a screw-rod, passing through the ends of the equalizer-bar, and are fitted with bearing-nuts, so that the chains may be taken up or let out, if required. The pressure of the water upon the piston forces it from the closed end of the cylinder, and for every foot it moves it uncoils two feet of the chain from the drum within the closed end of the cylinder. This coils the cable upon the drum outside the cylinder, and draws up the elevator-car.

Figure 1:
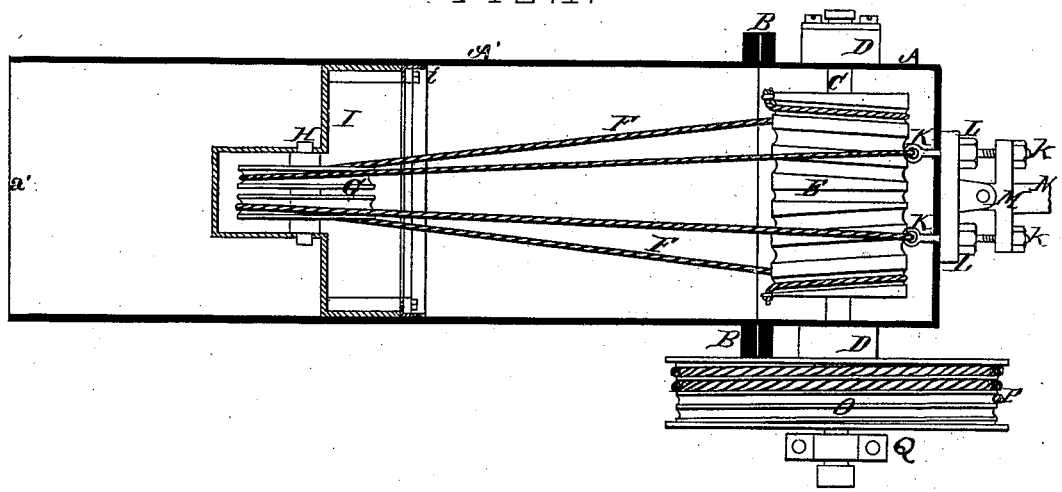
Figure 2:
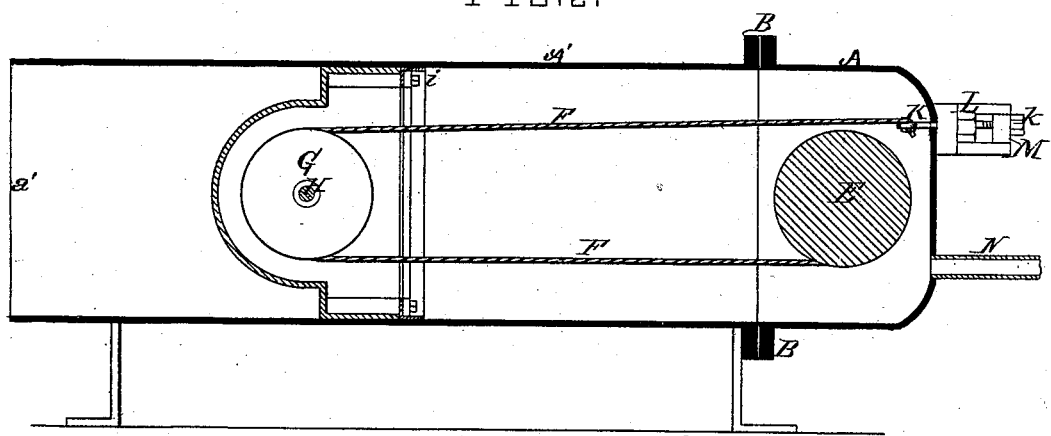
Figure 3:
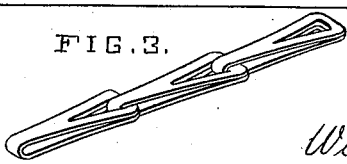

In the drawings, Figure 1 is a horizontal axial section of the cylinder and piston, showing the working parts in top view. Fig. 2 is a vertical axial view of the apparatus. Fig. 3 is a perspective view of a section of chain.

The cylinder is shown as made in two parts, A and A', connected together by a circumferential flange-joint at B; but I do not confine myself to this form of construction. The part A is closed at the end $a$, but the part A' is open at the end $a'$, so as to allow the air to enter. C is a horizontal shaft, passing diametrically through the cylinder and through bearings D at the sides thereof. The bearing-boxes are supplied with a water-packing to prevent the escape of water from the cylinder. I have used leather cap-packing both on the rods and shaft extending through the walls of the cylinder.

Upon the shaft C is a drum, E, within the cylinder, and to this drum are attached the two ends of the chains or wire cables F F, which, as the drum turns in the opposite directions, are wound upon or unwound from the drum. These chains or cables F extend from the drum E around the pulleys G upon a shaft, H, having bearings in the piston I, which piston works endwise in the cylinder. From the pulleys G the chains F extend to the rods K, which pass through the water-packing boxes L in the end $a$ of the cylinder, and through the ends of the equalizer-bar M. The portions of the rods K passing through the equalizer-bar are screw-threaded, and carry nuts $k$, resting against the outer side of the bar, so as to transmit the strain of the chains F to the bar. The bar is pivoted at the center, and thus acts to equalize the strain between the cables, and the nuts $k$ provide means for taking up the cables, or letting them out, if required.

The provision of the equalizer is of much importance, because it will prevent the strain from coming unequally on the two chains, which it would otherwise do, for it will be seen that the strain would be unequal if there were the slightest difference in diameter of the drum E at its different ends, or if the chains varied at all in length, either from original inequality or from change of temperature, causing unequal expansion or contraction in them, to which they would be liable from the impossibility of making two chains with the metal in one having exact uniformity with that in the other. Should the strain upon one chain be greater than upon the other it will tend to turn this piston out of line in the cylinder and cause friction and wear.

The piston has any suitable water-packing,

*i*. I prefer leather, such as is in ordinary use in hydrostatic presses.

N is a water-pipe, through which the water enters, and exhausts from the cylinder, the pipe being put, by a suitable three-way cock or valve, in connection with either the pressure water-pipe or the discharge-pipe. The pressure water-pipe is in communication with any water-supply under pressure, such as the city water-works or water from an elevated tank.

The water, entering the cylinder, presses against the inner end of the piston and drives it toward the end *a'* of the cylinder, thus uncoiling the chains or cables from the drum E and rotating the shaft C so as to coil the car-cable P upon the drum O on the shaft C, outside the cylinder.

Q is a pillow-block, upon which the outer end of the shaft C has bearing.

The cock or valve governing the induction and eduction of water to and from the cylinder would be operated by a cord, rod, or cable in reach of a person upon the car, as usual; and as no novelty is claimed in this part of the apparatus, and it is well known to mechanics, no particular description of it is required.

In Fig. 3 is shown a form of chain, F, well adapted for use within the cylinder, upon the drum E. Each link *f* is formed with an eye in each end, and the bend of each link engages in the eyes of the next link. It will be seen that this chain requires no welding, and is sufficiently flexible.

The links may be stamped out of plate-iron; or, if preferred, they may be made of bar-iron welded. Either this form of chain or any other, or metallic cables, or even flexible strips of metal, may be used upon drum E.

The operation is as follows: When it is required to elevate the car, the water is admitted into the cylinder at any desired speed, and this causes the piston I, with its pulleys G, to travel away from the drum E and uncoil the chains F therefrom, causing the shaft C and drum O to turn so as to coil the car-cable P upon drum O and raise the car. When the car has attained the required elevation the cock or valve is closed, so as to prevent the water passing through pipe N. When the car is required to descend, the cock or valve is put in position to allow the escape of water from the cylinder, and the weight of the car causes it to descend and uncoil cable P from drum O, and thus wind chains F upon drum E and draw back the piston I toward the end *a* of the cylinder, the speed of descent being regulated by the degree to which the valve is opened.

As a modification the chains F might be attached directly to the piston I, or to an equalizer-bar thereupon; but in this case the cylinder would require to have about twice the length or the proportion of the drums E and O changed to cause an equal movement in the elevator-car for one stroke of the piston. The equalizer-bar in this modification would be outside the piston, if it is desired that the adjusting-nut *k* should be reachable at all times.

As another modification, in place of the drum O on shaft C, there may be a band-pulley or cog-wheel at O, engaged with a similar pulley or wheel upon another shaft, which latter shaft would carry the drum on which car-cable P would be coiled.

I claim herein as my invention—

1. The combination of cylinder A, shaft C, passing through the same and carrying drums or pulleys E, and drum, pulley, or wheel O, respectively inside and outside said cylinder, chain, cable, or band F, and piston I, substantially as set forth.

2. The combination of drums E and O on shaft C, cylinder A, piston I, and chains, cables, or bands F, and equalizer M, substantially as set forth.

3. The combination of cylinder A, shaft C, passing transversely through the same, carrying drums E, and drum, pulley, or wheel O, chains, cables, or bands F, pulleys G, piston I, stuffing-boxes L, equalizer M, substantially as set forth.

WILLIAM O'KEEFE.

Witnesses:
SAML. KNIGHT,
CHAS. HALL.